(12) United States Patent
Noda et al.

(10) Patent No.: US 11,643,303 B2
(45) Date of Patent: May 9, 2023

(54) ELEVATOR PASSENGER DETECTION SYSTEM

(71) Applicant: TOSHIBA ELEVATOR KABUSHIKI KAISHA, Kawasaki (JP)

(72) Inventors: Shuhei Noda, Kawasaki (JP); Kentaro Yokoi, Kawasaki (JP); Sayumi Kimura, Kawasaki (JP); Satoshi Tamura, Hamura (JP)

(73) Assignee: TOSHIBA ELEVATOR KABUSHIKI KAISHA, Kawasaki (JP)

( * ) Notice: Subject to any disclaimer, the term of this patent is extended or adjusted under 35 U.S.C. 154(b) by 686 days.

(21) Appl. No.: 16/699,988

(22) Filed: Dec. 2, 2019

(65) Prior Publication Data
US 2020/0299104 A1 Sep. 24, 2020

(30) Foreign Application Priority Data

Mar. 18, 2019 (JP) .............................. JP2019-049877

(51) Int. Cl.
*B66B 13/26* (2006.01)
*G06T 7/70* (2017.01)
*B66B 3/00* (2006.01)
*G06V 40/10* (2022.01)

(52) U.S. Cl.
CPC .............. *B66B 13/26* (2013.01); *B66B 3/002* (2013.01); *G06T 7/70* (2017.01); *G06V 40/10* (2022.01); *G06T 2207/30196* (2013.01)

(58) Field of Classification Search
CPC .................................. B66B 13/26; G06T 7/70

USPC ......................................................... 187/317
See application file for complete search history.

(56) References Cited

U.S. PATENT DOCUMENTS

| | | | |
|---|---|---|---|
| 2017/0197807 A1* | 7/2017 | Noda | ..................... H04N 7/185 |
| 2018/0339879 A1* | 11/2018 | Quaretti | .................. B66B 3/023 |
| 2019/0185295 A1 | 6/2019 | Noda et al. | |

FOREIGN PATENT DOCUMENTS

| | | | | |
|---|---|---|---|---|
| CN | 108622777 A | 10/2018 | | |
| JP | 10-152277 A | 6/1998 | | |
| JP | 2007-314284 A | 12/2007 | | |
| JP | 2008-100782 A | 5/2008 | | |
| JP | 2018-30676 A | 3/2018 | | |
| JP | 2018-162117 A | 10/2018 | | |
| JP | 2018162117 A | * 10/2018 | ........... B66B 13/146 |
| JP | 2019-108182 A | 7/2019 | | |
| SG | 10201800802 S | 1/2020 | | |
| WO | 00/47511 A1 | 8/2000 | | |

* cited by examiner

*Primary Examiner* — Amir Shahnami
(74) *Attorney, Agent, or Firm* — Maier & Maier, PLLC

(57) ABSTRACT

According to one embodiment, an elevator passenger detection system comprises an image capturing unit, a detection area setting unit, and a detection processing unit. The image capturing unit captures an image in a predetermined range including a vicinity of a doorway at which a door is opened or closed, from an inside of a car. The detection area setting unit sets a detection area on a front return panel provided on at least one of sides of a doorway of the car, on the captured image obtained by the image capturing unit. The detection processing unit detects presence of a passenger or an object, based on the image in the detection area set by the detection area setting unit.

20 Claims, 8 Drawing Sheets

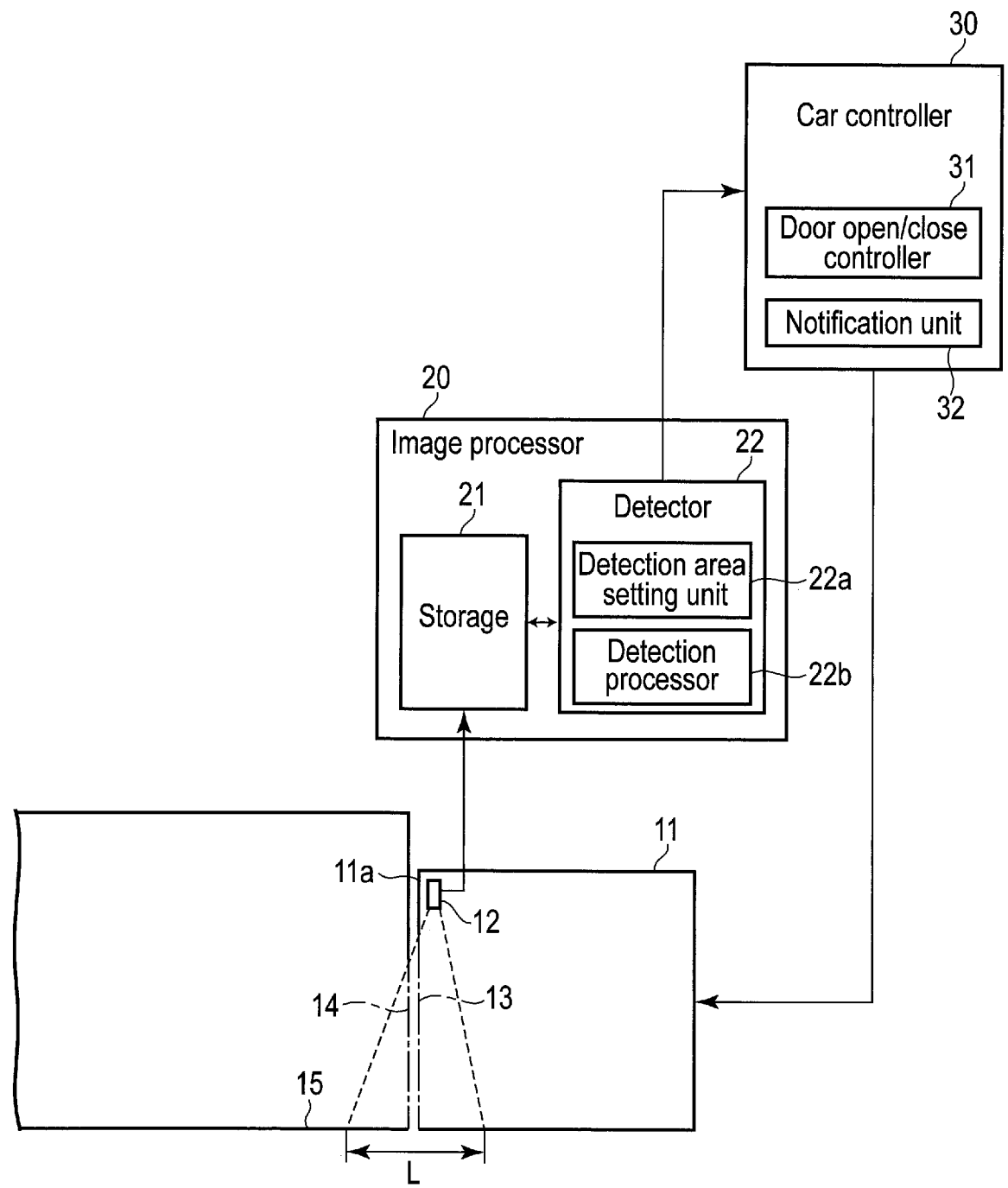
F I G. 1

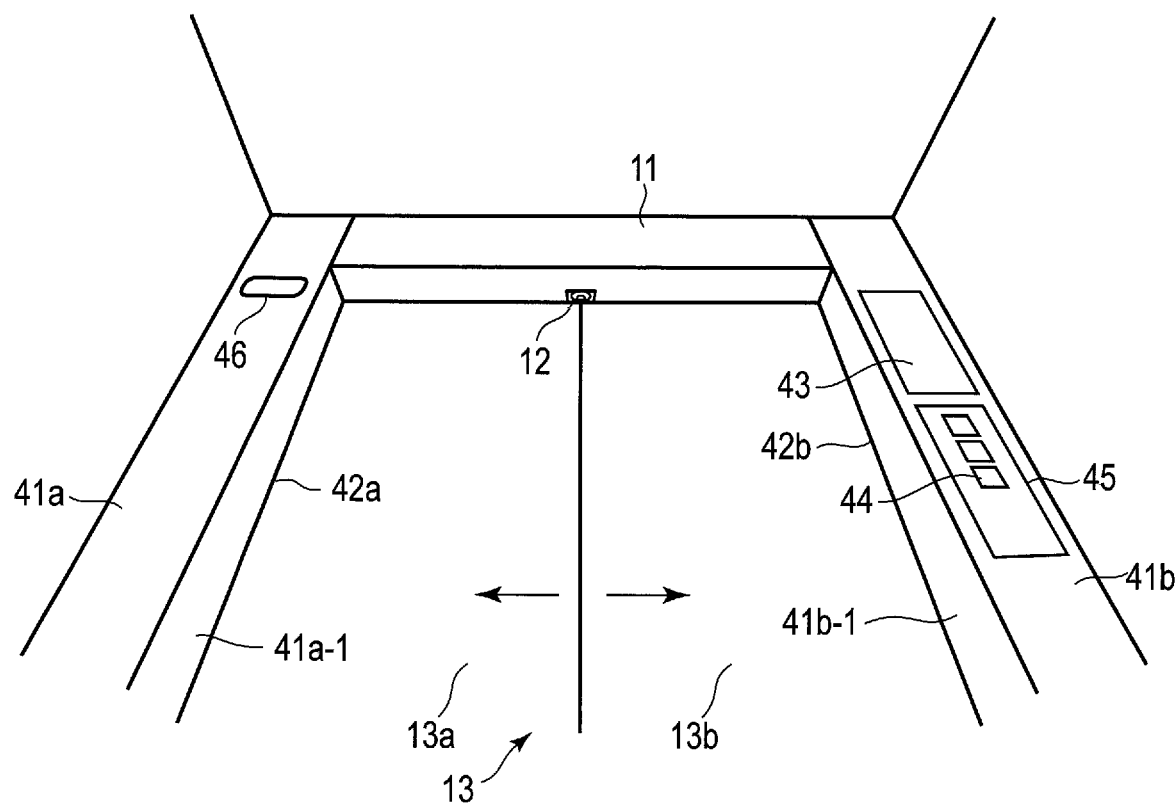
F I G. 2
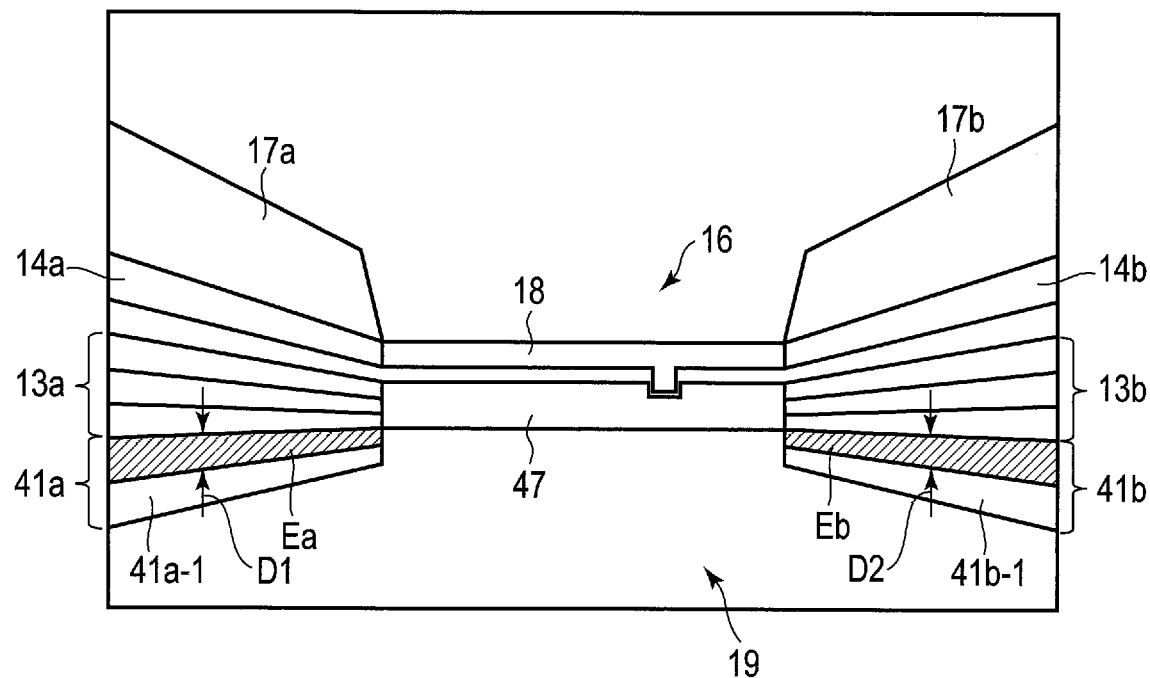
F I G. 3

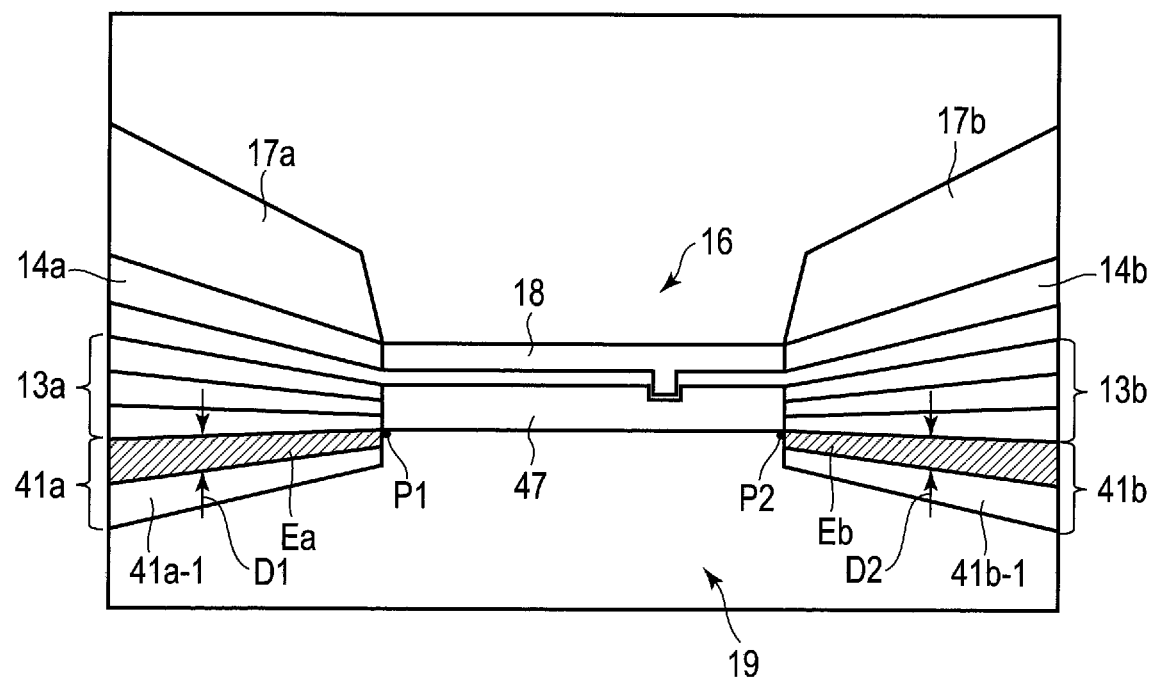
F I G. 7
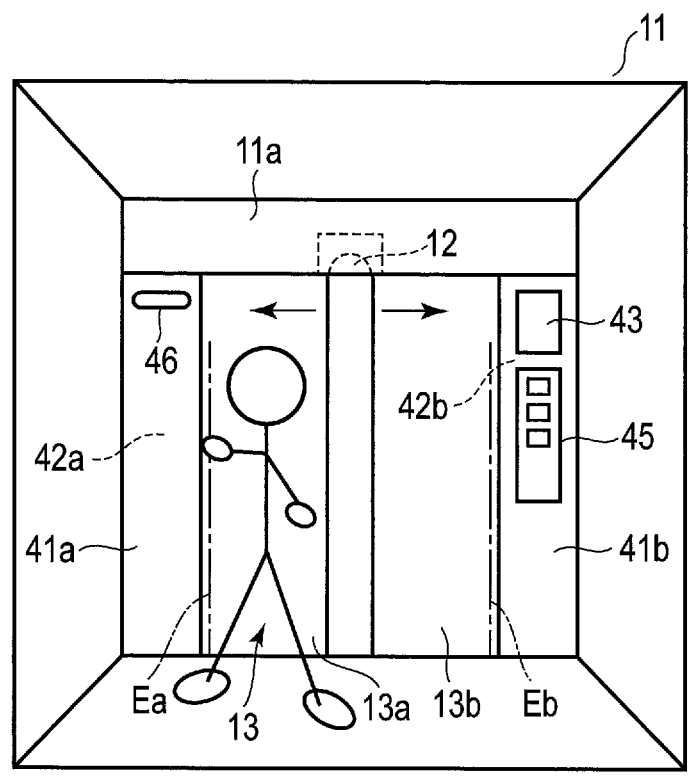
F I G. 8

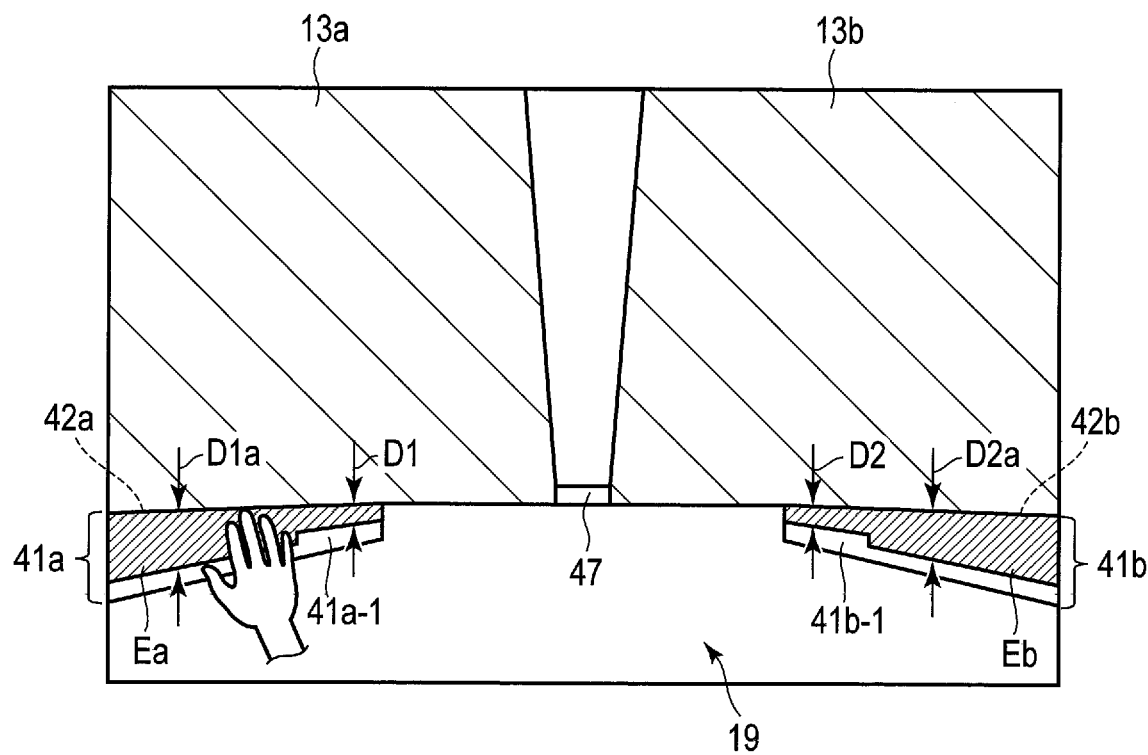
F I G. 9
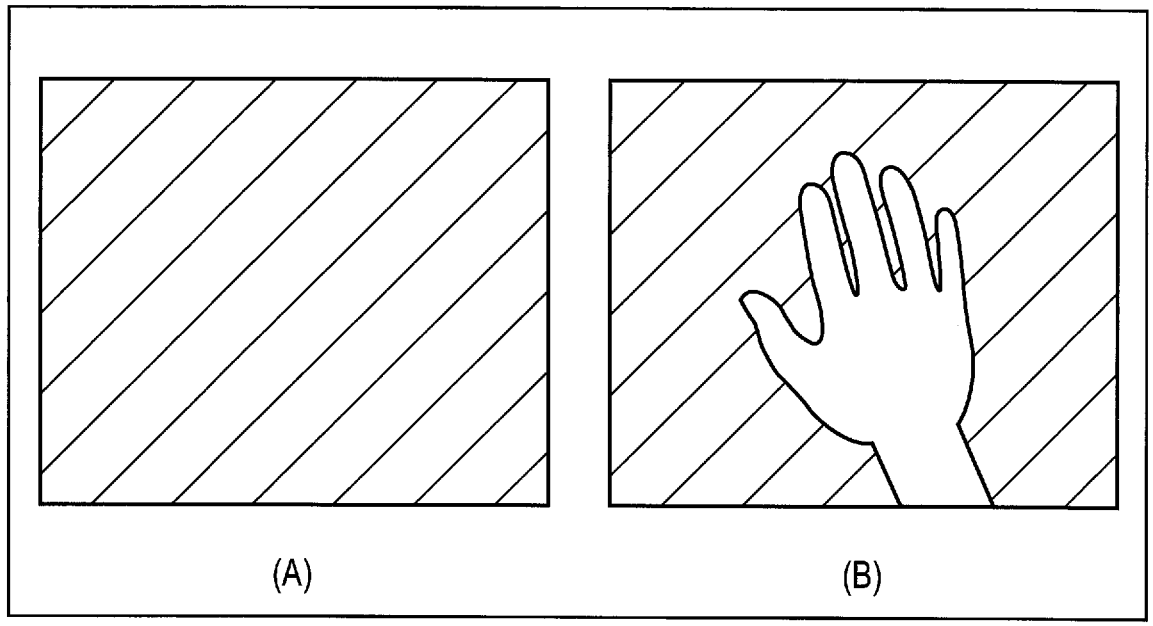
F I G. 10

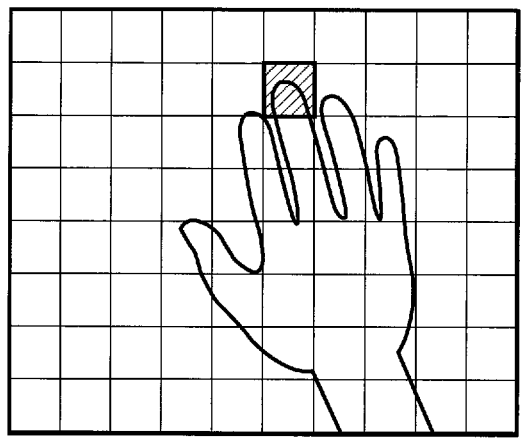
F I G. 11
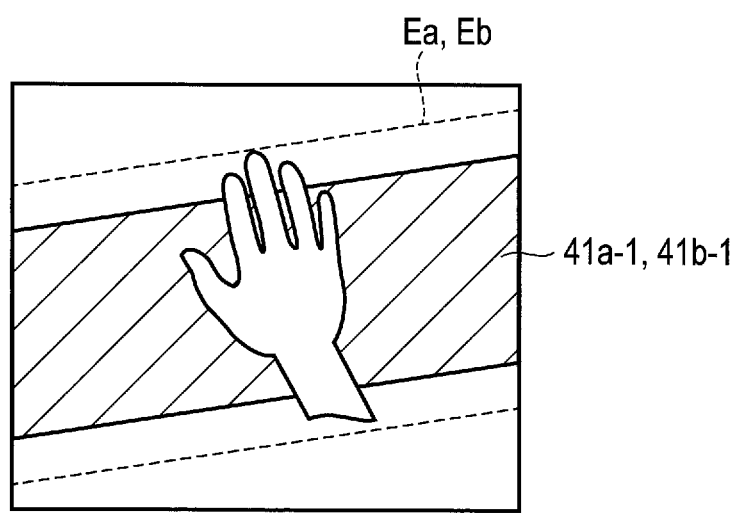
F I G. 12

ELEVATOR PASSENGER DETECTION SYSTEM

CROSS-REFERENCE TO RELATED APPLICATIONS

This application is based upon and claims the benefit of priority from Japanese Patent Application No. 2019-049877, filed Mar. 18, 2019, the entire contents of which are incorporated herein by reference.

FIELD

Embodiments described herein relate generally to an elevator passenger detection system.

BACKGROUND

When a door of an elevator car opens a passenger's finger or the like is often pulled into a door pocket. A method of installing a photoelectric sensor near, for example, a door pocket and detecting a passenger or the like near the door pocket and issuing an alarm to prevent such an accident is known.

According to the method of using sensors such as a photoelectric sensor mentioned above, however, the sensors may work when a passenger merely moves near the door pocket and may frequently issue alarms. For this reason, work for fine adjustment of the installation position is required to prevent the sensors from making detection errors. In center open type doors, door pockets are provided on both sides of a doorway of the car, and sensors need to be installed for these door pockets.

BRIEF DESCRIPTION OF THE DRAWINGS

FIG. 1 is a diagram showing a configuration of an elevator passenger detection system according to one of embodiments.

FIG. 2 is a view showing a structure of a doorway portion in a car according to the embodiment.

FIG. 3 is a view showing an example of an image captured by a camera according to the embodiment.

FIG. 7 is a view illustrating another area setting method according to the embodiment.

FIG. 8 is a view showing a relationship between a passenger and a detected area in the car according to the embodiment.

FIG. 9 is a view showing a relationship between a passenger and a detected area in a captured image according to the embodiment.

FIG. 10 is a view illustrating a difference method employed in passenger detection processing according to the embodiment.

FIG. 11 is a view illustrating motion detection employed in the passenger detection processing according to the embodiment.

FIG. 12 is a view illustrating boundary detection employed in the passenger detection processing according to the embodiment.

DETAILED DESCRIPTION

Figure 4:
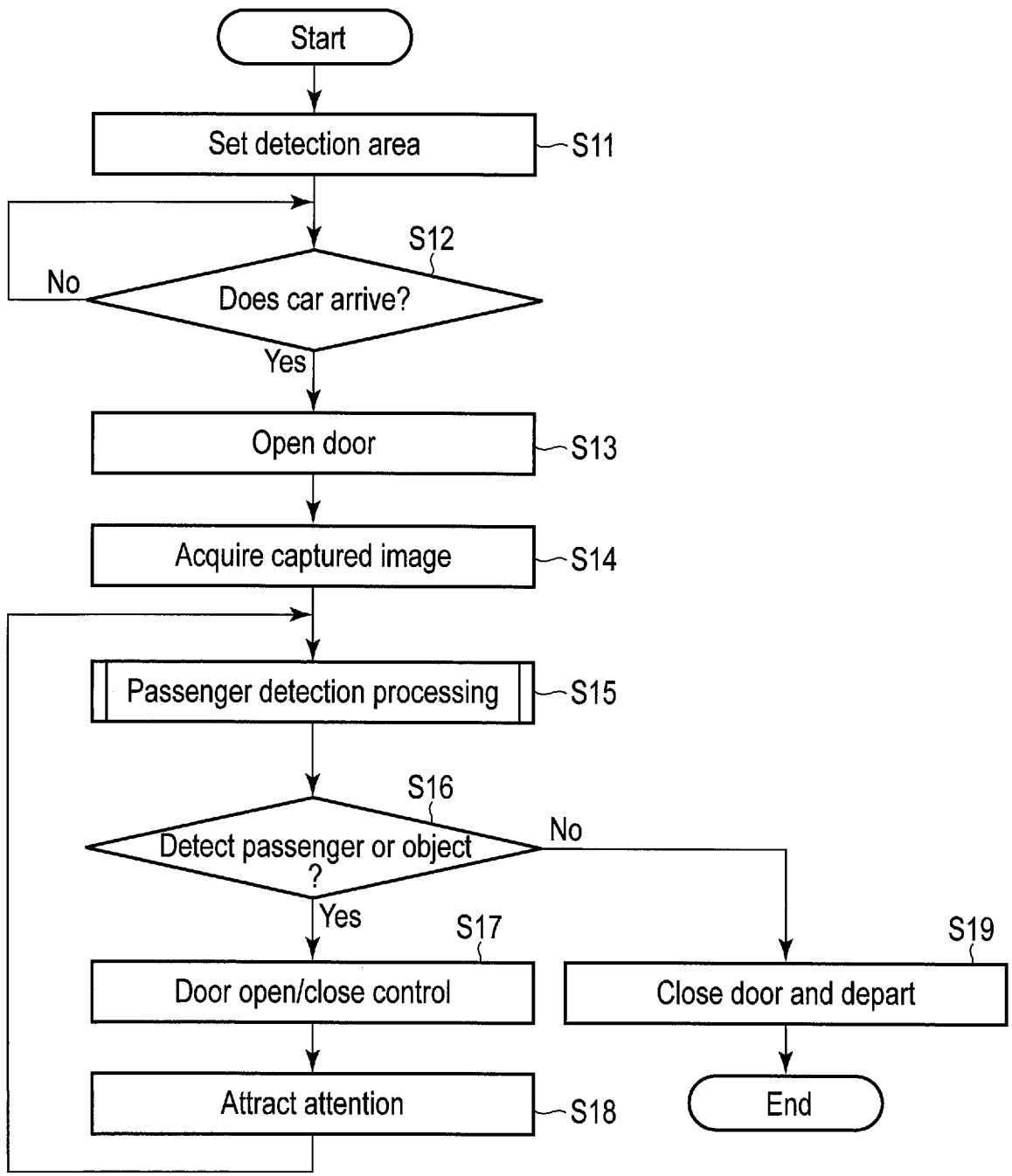
FIG. 4 is a flowchart showing a flow of entire processing of the passenger detection system according to the embodiment.

In general, according to one embodiment, an elevator passenger detection system includes an image capturing unit, a detection area setting unit, and a detection processing unit.

The image capturing unit captures an image in a predetermined range including a vicinity of a doorway at which a door is opened or closed, from an inside of a car. The detection area setting unit sets a detection area on a front return panel provided on at least one of sides of a doorway of the car, on the captured image obtained by the image capturing unit. The detection processing unit detects presence of a passenger or an object, based on the image in the detection area set by the detection area setting unit.

Embodiments will be described hereinafter with reference to the accompanying drawings.

The disclosure is merely an example and is not limited by contents described in the embodiments described below. Modification which is easily conceivable by a person of ordinary skill in the art comes within the scope of the disclosure as a matter of course. In order to make the description clearer, the sizes, shapes and the like of the respective parts may be changed and illustrated schematically in the drawings as compared with those in an accurate representation. Constituent elements corresponding to each other in a plurality of drawings are denoted by like reference numerals and their detailed descriptions may be omitted unless necessary.

FIG. 1 is a diagram showing a configuration of an elevator passenger detection system according to one of embodiments. Explanation will be made below by taking one car as an example, but the same structure will also be applied to a plurality of cars.

A camera 12 is installed in the upper part of a doorway of a car 11. More specifically, the camera 12 is installed in a modesty panel 11a that covers the upper part of the doorway of the car 11, with its lens part inclined downwardly or inclined toward a hall 15 side or an inner side of the car 11 at a predetermined angle.

The camera 12 is, for example, a compact monitor camera such as an in-vehicle camera, equipped with a wide-angle lens or fisheye lens, and can continuously capture images of several frames per second (for example, 30 frames/sec). The camera 12 is activated when the car 11 arrives at the hall 15 of each floor to capture an image of a predetermined range L including the vicinity of the car door 13.

If the location of installation of the camera 12 is the vicinity of the car door 13, it may not be an upper part of the doorway of the car 11. For example, the location of installation of the camera 12 may be a location where the camera can capture an image of the vicinity of the doorway of the car 11, such as an upper part of a side wall close to the doorway of the car 11. When the camera 12 is installed at such a location, a detection area to be described later can be set appropriately and a passenger or object can be accurately detected from the image in the detection area.

In contrast, a monitoring camera generally used for the purpose of monitoring is installed at a back part of the car or on a ceiling surface, and its capturing range is wide over a whole inside of the car. For this reason, the detection area can hardly be set and, there is a high possibility that detection will be made including a passenger remote from the doorway of the car 11.

In the hall 15 of each floor, a hall door 14 is installed to freely open/close at an arrival gate of the car 11. The hall door 14 opens and closes while engaging with the car door 13 when the car 11 arrives. A power source (a door motor) is located on the car 11 side, and the hall door 14 only opens/closes following the car door 13. In the following descriptions, it is assumed that the hall door 14 is opened when the car door 13 is opened, and that the elevator hall door 14 is closed when the car door 13 is closed.

Each of images (video) sequentially captured by the camera 12 is subjected to analytical processing by the image processor 20 in real time. The image processor 20 is taken out from the car 11 in FIG. 1 for the sake of convenience but, in fact, the image processor 20 is accommodated in the modesty panel 11a together with the camera 12.

The image processor 20 is equipped with a storage 21 and a detector 22. The storage 21 includes a buffer area to sequentially store the images captured by the camera 12 and to temporally store the data necessary for the processing of the detector 22. In the storage 21, an image subjected to processing such as distortion correction, scaling, and partial cutting may be stored as preprocessing for a captured image.

The detector 22 detects a passenger near the car door 13 with the captured image of the camera 12. The detector 22 is functionally composed of a detection area setting unit 22a and a detection processor 22b.

The detection area setting unit 22a sets a detection area on a front return panel provided on at least one of both sides of the doorway of the car 11 on the captured image of the camera 12. More specifically, the detection area setting unit 22a sets the detection area having a strip shape along an inner side surface of the front return panel. The "front return panel" is also called a doorway panel or a doorway jamb, which is provided on both sides or one of the sides of the doorway of the car 11 (see FIG. 2). In general, a door pocket is provided on a back side of the front return panel to contain the car door 13.

The detection processor 22b detects presence of a passenger or an object, based on the image in the detection area set by the detection area setting unit 22a. The "object" implies, for example, passenger's clothes and baggage, and a moving body such as a wheelchair. A car controller 30 may comprise several or all functions of the image processor 20.

The car controller 30 controls operations of various types of devices (a destination floor button, an illumination, etc.) installed in the car 11. In addition, the car controller 30 comprises a door open/close controller 31 and a notification unit 32. The door open/close controller 31 controls opening and closing of the car door 13 when the car 11 arrives at the hall 15. More specifically, the door open/close controller 31 opens the car door 13 when the car 11 arrives at the hall 15, and closes the door after a predetermined time elapses.

When a passenger or an object is detected by the detection processor 22b while the door of the car door 13 is opened, the door open/close controller 31 controls opening/closing of the door to avoid a door accident (i.e., an accident of being pulled into a door pocket). More specifically, the door open/close controller 31 temporarily stops the door open operation of the car door 13, moves the door in an opposite direction (door close direction), or makes the door open speed of the car door 13 slower. The notification unit 32 attracts attention of a passenger in the car 11, based on the result of detection of the detection processor 22b.

FIG. 2 is a view showing a structure of the doorway portion in the car 11.

The car door 13 is installed to be freely opened/closed in the doorway of the car 11. In the example of FIG. 2, the car door 13 of a two-leaved center open type is shown, and two door panels 13a and 13b constituting the car door 13 open and close in mutually opposite directions along an entrance direction (horizontal direction). The "entrance" is the same as the doorway of the car 11.

Front columns 41a and 41b are provided on both sides of the doorway of the car 11 to cover the doorway of the car 11 together with the modesty panel 11a. When the car door 13 is opened, the door panel 13a is contained in a door pocket 42a provided on a back side of the front return panel 41a, the door panel 13b is contained in a door pocket 42b provided on a back side of the front return panel 41b.

A display 43, an operating panel 45 on which a destination floor button 44 and the like are arranged, and a speaker 46 are installed on either or both of the front return panels 41a and 41b. In the example of FIG. 2, the speaker 46 is installed on the front return panel 41a, and the display 43 and the operating panel 45 are installed on the front return panel 41b.

The camera 12 is installed at a central part of the modesty panel 11a on the upper part of the doorway of the car 11. The camera 12 is installed to face downwardly from a lower part of the modesty panel 11a so as to capture an image of the vicinity of the doorway (see FIG. 3) when the car door 13 is opened together with the hall door 14.

FIG. 3 is an illustration showing an example of an image captured by the camera 12. The figure shows a case the camera captures an image while facing downwardly from the upper part of the doorway of the car 11 when the car door 13 (door panels 13a and 13b) and the hall door 14 (door panels 14a and 14b) are fully opened. In FIG. 3, the upper side shows the hall 15, and the lower side shows the inside of the car 11.

On the hall 15, jambs 17a and 17b are provided on both sides of the entrance of the car 11, and a strip-shaped hall sill 18 having a predetermined width is arranged along the open/close direction of the hall door 14, on the floor surface 16 between the jambs 17a and 17b. In addition, a strip-shaped car sill 47 having a predetermined width on the doorway side of the floor surface 16 of the car 11 is arranged along the open/close direction of the car door 13.

On the captured image, detection areas Ea and Eb are set on inner side surfaces 41a-1 and 41b-1 of the front return panels 41a and 41b, respectively. The detection areas Ea and Eb are areas for detecting a passenger or an object on the captured image, which are used to prevent an accident of being pulled into the door pockets 42a and 42b during the door open/close operation.

The detection areas Ea and Eb are set to be in strip shapes having predetermined widths D1 and D2 in the width direction of the inner side surfaces 41a-1 and 41b-1 of the front return panels 41a and 41b, respectively. The widths D1 and D2 are set be the same as or slightly smaller than, for example, horizontal widths (widths in the short direction) of the inner side surfaces 41a-1 and 41b-1. The widths D1 and D2 may be the same value or different values.

In addition, for example, widths D1a and D2a of portions which a passenger can easily touch by the hand may be made slightly larger than the widths D1 and D2 by partially varying the widths D1 and D2. An accident of being pulled into the door pocket can be thereby detected soon.

Front surfaces of the front return panels 41a and 41b are set to be out of the set area. This is because the operating panel 45 and the like are arranged on the front surfaces of the front return panels 41a and 41b and a passenger often exists near the operating panel 45 and the like. According to the inner side surfaces 41a-1 and 41b-1 of the front return panels 41a and 41b, the detector does not make an error of detecting a passenger operating the operating panel 45, or the like, and can set the detection areas Ea and Eb that are not influenced by the open/close operation of the car door 13.

Next, the operation of the present system will be described in detail.

FIG. 4 is a flowchart showing a flow of the entire processing in the present system.

First, the detection area setting processing is performed by the detection area setting unit 22a of the detector 22 provided in the image processor 20 as initial setting (step S11). The detection area setting processing is performed in the following manner when, for example, the camera 12 is installed or the position of installation of the camera 12 is adjusted.

That is, the detection area setting unit 22a sets the detection areas Ea and Eb on the image captured by the camera 12. More specifically, if the car door 13 is the two-leaved center open type, the detection area setting unit 22a sets the detection area Ea on the inner side surface 41a-1 of the front return panel 41a near the door pocket 42a in which the door panel 13a is pulled. Then, the detection area setting unit 22a sets the detection area Eb on the inner side surface 41b-1 of the front return panel 41b near the door pocket 42b in which the door panel 13b is pulled.

The areas in which the front return panels 41a and 41b are shown on the captured image are calculated, based on design values of components of the car 11 and the value inherent to the camera 12.

Width of entrance (width of doorway of car)
Height of door
Width of column
Door type (center open type/right or left side open type)
Relative position (three-dimensional) of camera to the entrance
Angle of camera (three axes)
Angle of view of the camera (focal length)

The detection area setting unit 22a calculates the area in which the front return panels 41a and 41b are shown on the captured image, based on these values. That is, the detection area setting unit 22a assumes that the front return panels 41a and 41b stand upright from both ends of the entrance (doorway), and calculates three-dimensional coordinates of the front return panels 41a and 41b, based on the relative position, angle, and angle of view of the camera 12 relative to the entrance.

Figure 5:
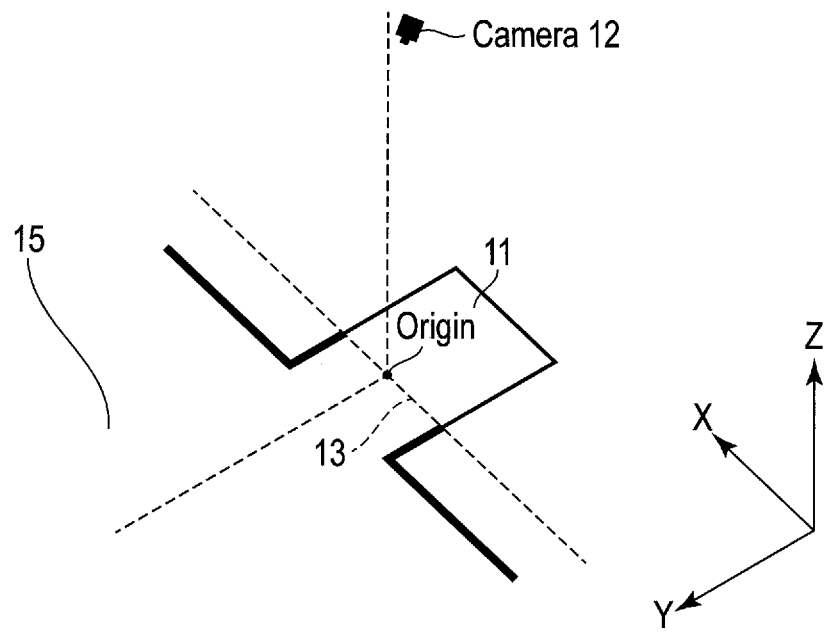
FIG. 5 is a view illustrating a coordinate system in a real space according to the embodiment.

The three-dimensional coordinates are coordinates in a case where a direction parallel to the car door 13 is referred to as an X axis, a direction of the hall 15 from the center of the car door 13 (i.e., a direction perpendicular to the car door 13) is referred to as a Y axis, and a height direction of the car 11 is referred to as a Z axis as shown in FIG. 5.

Figure 6:
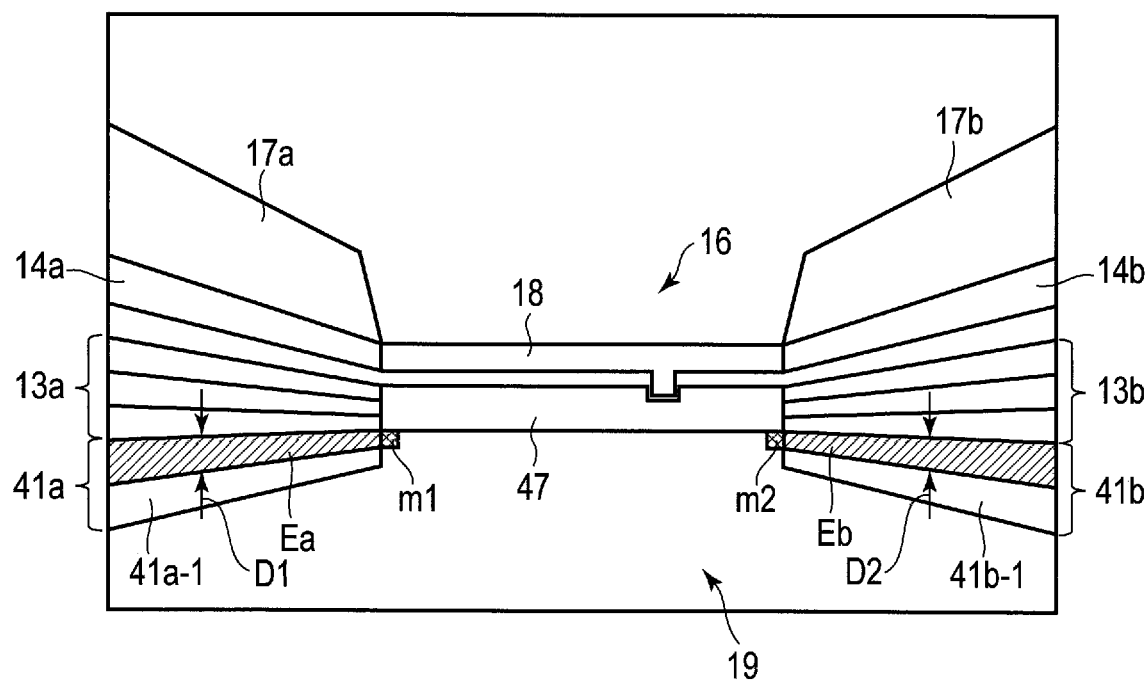
FIG. 6 is a view illustrating an area setting method according to the embodiment.

As show in FIG. 6, for example, markers m1 and m2 may be located on both ends inside the car of the car sill 47, and three-dimensional coordinates of the front return panels 41a and 41b may be obtained with reference to the positions of the markers m1 and m2. Alternatively, as shown in FIG. 7, positions of two points P1 and P2 inside the car of the car sill 47 may be obtained by image processing, and three-dimensional coordinates of the front return panels 41a and 41b may be obtained with reference to the positions of the markers m1 and m2.

The detection area setting unit 22a obtains the area where the front return panels 41a and 41b on the captured image are shown by projecting three-dimensional coordinates of the front return panels 41a and 41b to two-dimensional coordinates on the captured image, and sets the detection areas Ea and Eb in this area. More specifically, the detection area setting unit 22a sets the detection areas Ea and Eb having predetermined widths D1 and D2 along the longitudinal direction of the inner side surfaces 41a-1 and 41b-1 of the front return panels 41a and 41b.

The processing of setting the detection areas Ea and Eb may be performed in a state in which the car door 13 is opened or a state in which the car door 13 is closed. When the car door 13 is closed, the hall 15 is not shown in the captured image of the camera 12 and the detection areas Ea and Eb can be set accordingly. In general, the horizontal width (width in the short direction) of the car sill 47 is shorter than the thickness of the car door 13. For this reason, even if the car door 13 is fully closed, one end side of the car sill 47 is shown in the captured image. Therefore, the positions of the front return panels 41a and 41b can be specified with reference to the position of one end side, and the detection areas Ea and Eb can be set.

When the passenger touches the inner side surface 41a-1 of the front return panel 41a by the hand while the door is opened as shown in FIG. 8 and FIG. 9, the hand can be detected before the hand is pulled into the door pocket 42a, by thus setting the detection areas Ea and Eb on the inner side surfaces 41a-1 and 41b-1 of the front return panels 41a and 41b.

Actions of the car 11 in the operation will be described below.

As shown in FIG. 4, when the car 11 arrives at the hall 15 of any floor (Yes in step S12), the car controller 30 opens the car door 13 (step S13).

At this time (in the operation of opening the car door 13), an image of the vicinity of the car door 13 (front return panels 41a and 41b, and the like) is captured at a predetermined frame rate (for example, 30 frames/sec) by the camera 12 installed at the upper part of the doorway of the car 11. The image processor 20 acquires images captured by the camera 12 on a time-series basis and, while sequentially saving these images in the storage 21 (step S13), executes the following passenger detection processing in real time (step S15). Distortion correction, scaling, and partial cutting of the image may be executed as preprocessing for the captured image.

The passenger detection processing is performed by the detection processor 22b of the detector 22 provided in the image processor 20.

That is, the detection processor 22b extracts images in the detection areas Ea and Eb from a plurality of captured images obtained on a time-series basis by the camera 12 and detects presence of a passenger or an object, based on these images. More specifically, the detection is executed in the following method.

(a) Difference Method

As shown in FIG. 10, the detection processor 22b compares the images in the detection areas Ea and Eb with a basic image on a time-series basis and detects the presence of a passenger or an object based on difference in the images. FIG. 10(A) shows a basic image, extracting the image in the detection areas Ea and Eb from the images preliminarily captured by the camera 12 in a state where a passenger or an object is not present in the car 11. FIG. 10(B) shows a detection target image, extracting the image in the detection areas Ea and Eb from the images captured while the door is opened.

The detection processor 22b compares the basic image with the detection target image and, if the images include more than a predetermined quantity of portions different in pixel value, determines that a passenger or an object is present near the door pockets 42a and 42b.

(b) Motion Detection

As shown in FIG. 11, the detection processor 22b divides the captured image in matrix in predetermined block units, focuses attention on a block including motion, of these blocks, and detects the presence of a passenger or an object.

More specifically, the detection processor 22b reads the images stored in the storage 21 one by one on a time-series basis and calculates an average luminance value of these images for each block. At this time, the detection processor 22b is assumed to hold the average luminance value of each block calculated when the first image is input as the initial value, in a first buffer area (not shown) in the storage 21.

When a second image and the following images are obtained, the detection processor 22b compares the average luminance value of each block of a current image with the average luminance value of each block of a previous image held in the first buffer area. As a result, when a block having a brightness difference greater than or equal to a preset value exists in the current image, the detection processor 22b determines this block as a block representing motion. When the presence or absence of the motion for the current image is determined, the detection processor 22b holds the average luminance value for each block of this image, in the first buffer area, as a luminance value for comparison with the next image. After this, similarly, the detection processor 22b repeats determining the presence or absence of the motion while comparing the luminance values of the respective images on a time-series basis in units of blocks.

The detection processor 22b confirms whether the block including motion is included in the image in the detection areas Ea and Eb or not. As a result, if the block including motion is included in the image in the detection areas Ea and Eb, the detection processor 22b determines that a passenger or an object is present near the door pockets 42a and 42b.

As shown in FIG. 3, the detection areas Ea and Eb are set on the inner side surfaces 41a-1 and 41b-1 of the front return panels 41a and 41b. Therefore, the motion made when the car door 13 (door panels 13a and 13b) is opened or closed is not detected in the detection areas Ea and Eb.

(c) Boundary Detection

The detection processor 22b detects a boundary of the elevator structure from the image in the detection areas Ea and Eb. The "boundary of the elevator structure" indicates a boundary between the inner side surfaces 41a-1 and 41b-1 of the front return panels 41a and 41b and the door pockets 42a and 42b. The detection processor 22b determines that a passenger or an object is present if the boundary is interrupted (hidden partially).

According to this method, the detection areas Ea and Eb need to be extended and set to include the boundary as shown in FIG. 12. The method of detecting the boundary in the detection areas on the image is publicly known by, for example, JP 2019-108182 A, and its detailed descriptions are omitted here.

On the image captured by the camera 12, the boundary between the inner side surfaces 41a-1 and 41b-1 of the front return panels 41a and 41b and the door pockets 42a and 42b is shown irrespective of the opened or closed state of the car door 13. Therefore, a passenger or an object close to the door pockets 42a and 42b can be certainly detected and an error of detecting a passenger or an object remote from the door pockets 42a and 42b cannot be made, by determining whether the boundary is interrupted on the boundary or not.

As the other method, an object other than the elevator structure can be recognized in the image in the detection areas Ea and Eb and presence of a passenger or an object can be determined based on the recognition result. A generally known method of object recognition may be employed. Examples of the method include deep learning, support vector machine (SVM), random forest, and the like.

In FIG. 4, if presence of a passenger or an object in the detection areas Ea and Eb is detected in the operation of opening the car door 13 (Yes in step S16), a passenger detection signal is output from the image processor 20 to the car controller 30. When receiving the passenger detection signal, the door open/close controller 31 of the car controller 30 temporarily suspends the operation of opening the car door 13 and restarts the door open operation at the stop position after several seconds (step S17).

When the door open/close controller 31 receives the passenger detection signal, the speed of opening the car door 13 may be made slower than a general speed or the door open operation may be restarted after slightly moving the car door 13 in an opposite direction (door close direction).

In addition, the notification unit 32 of the car controller 30 makes voice announcement via a speaker 46 in the car 11 and attracts passenger's attention to move away from the door pockets 42a and 42b (step S18). The method of notification is not limited to the voice announcement, but may be displaying a message such as "staying near door pocket is dangerous, please move", or may be a combination of the voice announcement and the message display. Furthermore, an alarm sound may be emitted.

The above processing is repeated while a passenger or an object is detected in the detection areas Ea and Eb. Thus, for example, when a passenger brings a hand near the door pocket 42a, it is possible to preliminarily prevent the hand from being pulled into the door pocket 42a.

If presence of a passenger or an object in the detection areas Ea and Eb is not detected (No in step S16), the car controller 30 continues the operation of closing the car door 13 and allows the car 11 to move to a destination floor after closing the door is completed (step S19).

Figure 13:
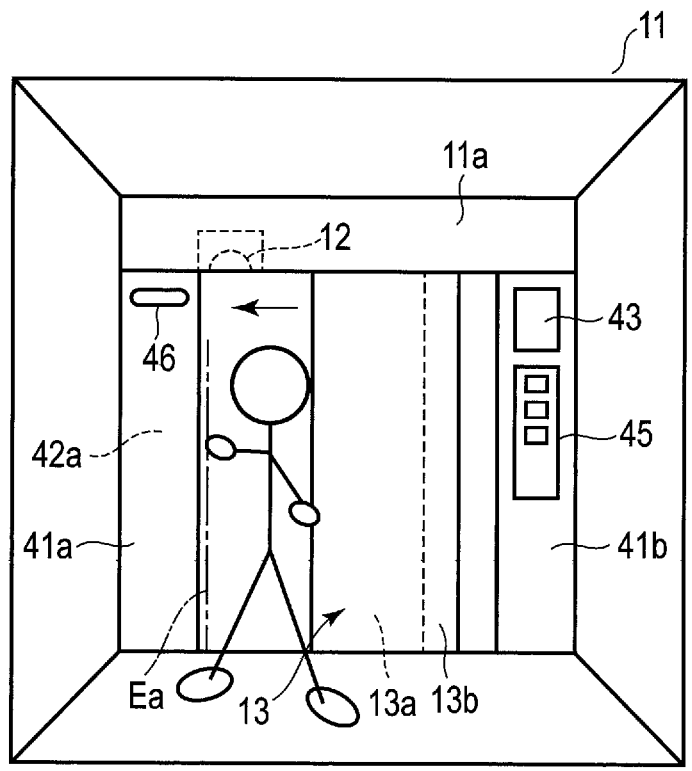
FIG. 13 is a view showing a structure of a doorway portion in a car using a side open type car door according to the embodiment.

The example of the car door of the center open type has been explained in the above embodiment, but the embodiment can be applied to the side open type as shown in FIG. 13.

Figure 14:
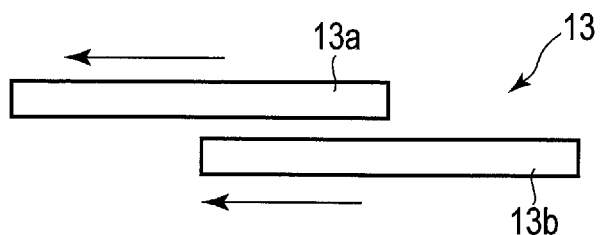
FIG. 14 is a view illustrating an open/close operation of the side open type car door according to the embodiment.

FIG. 13 is a view showing a structure of the doorway portion in the car using a car door of a two-leaved side open type. In this example, the car door 13 of the two-leaved side open type is installed to be freely opened/closed in the doorway of the car 11. The car door 13 comprises two door panels 13a and 13b as shown in FIG. 14, which open and close in the same direction along the entrance direction.

If the car door 13 is the side open type, the door pocket 42a is provided on one of sides of the doorway. In the example of FIG. 13, the door pocket 42a is provided on the left side of the doorway, and two door panels 13a and 13b are contained to overlap in the door pocket 42a when the door is opened.

The camera 12 installed on the modesty panel 11a is positioned closely to the door pocket 42a side, and the detection area Ea is set on the front return panel 41a on the door pocket 42a side. More specifically, the strip-shaped detection area Ea having the predetermined width D1 is preliminarily set along the inner side surface 41a-1 of the front return panel 41a. Thus, for example, if a passenger's hand is near the door pocket 42a, its state can be detected from the image in the detection area Ea, and an accident of being pulled into the door pocket 42a can be prevented by reflecting the detection result on the door open/close operations.

In FIG. 13, if the detection area Eb is also set on the other front return panel 41a, an accident of collision with the side end of the car door 13 (collision accident) can be prevented when the door is closed.

Thus, according to the present embodiment, a passenger or an object staying near the door can be exactly detected by preliminarily setting the detection areas Ea and Eb on both sides of the doorway of the car 11. Accidents to be caused when the door is opened and closed such as an accident of being pulled into the door pocket can be thereby prevented and the elevator can be operated safely. In contrast, an error of detecting a passenger or an object remote from the door can be avoided and unnecessary door control and unnecessary attraction of attention can be prevented, by limiting the locations where the detection areas Ea and Eb are set.

In the above-described embodiment, the detection areas Ea and Eb are set on both sides of the doorway of the car 11, but the detection area may be set on at least one side.

According to at least one embodiment described above, an elevator passenger detection system capable of accurately detecting a passenger or an object near a door and preventing an accident when a door opens or closes, without requiring a plurality of sensors, can be provided.

In the above-described embodiment, the door provided on the elevator car is assumed, but the embodiment can also be applied to, for example, an automatic door provided at an entrance of a building, and the like. That is, in a case of an automatic door at an entrance of a building, for example, a camera is installed at an upper part of the entrance, and detection areas Ea and Eb are set on inner sides of column portions on both sides of the entrance (or, in a side open type, either of the detection area is set) by using a captured image of the camera. After that, the passenger detection system detects a passenger or an object in the image in the detection areas Ea and Eb, reflect the detection result on the door open/close control, and attracts passenger's attention, similarly to the above-described embodiment.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An elevator passenger detection system, comprising:
   an image capturing unit capturing an image of a predetermined range including a vicinity of a doorway at which a door is opened or closed, from an inside of a car;
   a detection area setting unit setting a detection area on a front return panel provided on at least one of both sides of the doorway, on the captured image obtained by the image capturing unit; and
   a detection processing unit detecting presence of a passenger or an object, based on the image in the detection area set by the detection area setting unit;
   the detection area setting unit calculating a position of the front return panel on the captured image, based on a design value of each of components of the car, and an installation angle and an angle of view of the image capturing unit, and setting the detection area on the front return panel of the calculated position.

2. The elevator passenger detection system of claim 1, wherein
   the detection area is set on an inner side surface of the front return panel, on the captured image.

3. The elevator passenger detection system of claim 2, wherein
   the detection area is set to have a predetermined width, in a width direction of the inner side surface of the front return panel.

4. The elevator passenger detection system of claim 1, wherein
   the detection processing unit detects presence of a passenger or an object, based on the image in the detection area during an operation of opening the door.

5. The elevator passenger detection system of claim 1, wherein
   the image capturing unit is installed at an upper part of the doorway of the car.

6. The elevator passenger detection system of claim 1, wherein
   the detection processing unit compares images in the detection area on a time-series basis and detects presence of a passenger or an object, based on a difference of each of the images.

7. The elevator passenger detection system of claim 1, wherein
   the detection processing unit compares luminance of images in the detection area in block units, on a time-series basis, and detects presence of a passenger or an object, based on a block including motion.

8. The elevator passenger detection system of claim 1, wherein
   the detection processing unit detects a boundary between the front return panel and the doorway of the car based on the image in the detection area, and detects presence of a passenger or an object, based on whether the boundary is interrupted or not.

9. The elevator passenger detection system of claim 1, further comprising:
   a door open/close controller controlling an operation of opening or closing the door, based on the detection result of the detection processing unit.

10. The elevator passenger detection system of claim 1, further comprising:
    a notification unit attracting attention of a passenger in the car, based on the detection result of the detection processing unit.

11. An elevator passenger detection system, comprising:
    an image capturing unit capturing an image of a predetermined range including a vicinity of a doorway at which a door is opened or closed, from an inside of a car;

a detection area setting unit setting a detection area on a front return panel provided on at least one of both sides of the doorway, on the captured image obtained by the image capturing unit; and a detection processing unit detecting presence of a passenger or an object, based on the image in the detection area set by the detection area setting unit, the detection processing unit detecting a boundary between the front return panel and the doorway of the car based on the image in the detection area, and detecting presence of a passenger or an object, based on whether the boundary is interrupted or not.

12. The elevator passenger detection system of claim 11, wherein the detection area is set on an inner side surface of the front return panel, on the captured image.

13. The elevator passenger detection system of claim 12, wherein the detection area is set to have a predetermined width, in a width direction of the inner side surface of the front return panel.

14. The elevator passenger detection system of claim 11, wherein the detection area setting unit calculates a position of the front return panel on the captured image, based on a design value of each of components of the car, and an installation angle and an angle of view of the image capturing unit, and sets the detection area on the front return panel of the calculated position.

15. The elevator passenger detection system of claim 11, wherein the detection processing unit detects presence of a passenger or an object, based on the image in the detection area during an operation of opening the door.

16. The elevator passenger detection system of claim 11, wherein the image capturing unit is installed at an upper part of the doorway of the car.

17. The elevator passenger detection system of claim 11, wherein the detection processing unit compares images in the detection area on a time-series basis and detects presence of a passenger or an object, based on a difference of each of the images.

18. The elevator passenger detection system of claim 11, wherein the detection processing unit compares luminance of images in the detection area in block units, on a time-series basis, and detects presence of a passenger or an object, based on a block including motion.

19. The elevator passenger detection system of claim 11, further comprising:

a door open/close controller controlling an operation of opening or closing the door, based on the detection result of the detection processing unit.

20. The elevator passenger detection system of claim 11, further comprising:

a notification unit attracting attention of a passenger in the car, based on the detection result of the detection processing unit.

* * * * *